Figure 1:
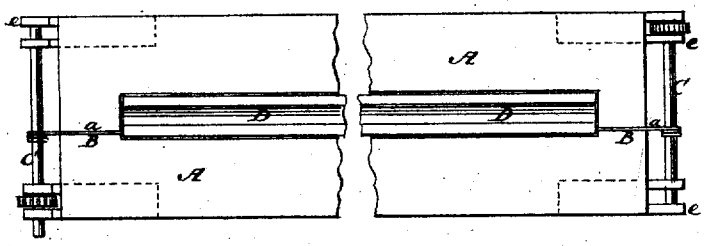

M. DELANEY.

Molds for Rubber Billiard Cushions.

No. 5,680. Reissued Dec. 9, 1873.

*Witnesses.*

E. Wolf.

Jacob Felbel.

*Inventor.*

Mathew Delaney

By his attorney

J. N. McIntire

AM. PHOTO-LITHOGRAPHIC Co. N.Y. (OSBORNE'S PROCESS.)

UNITED STATES PATENT OFFICE.

MATHEW DELANEY, OF NEW YORK, N. Y.

IMPROVEMENT IN MOLDS FOR RUBBER BILLIARD-CUSHIONS.

Specification forming part of Letters Patent No. 116,819, dated July 11, 1871; reissue No. 5,680, dated December 9, 1873; application filed November 11, 1873.

DIVISION A.

*To all whom it may concern:*

Be it known that I, MATHEW DELANEY, of New York city, in the county and State of New York, have invented a new apparatus for the molding and vulcanization of that kind of billiard-cushions which is manufactured with a hole running longitudinally, near the face, for the reception of some sort of wire, cord, strip, or other auxiliary device; and I do hereby declare the following to be a full, clear, and exact description thereof, reference being had to the accompanying drawings, forming part of this specification.

Previous to my invention great difficulty has been encountered in the manufacture of that kind of cushion composed of a rubber body with an inclosed or incorporated wire, or other small strip or cord, arranged longitudinally in, parallel with, and near the face of the cushion, because, in making such cushions, it has been found, first, that when the wire or cord to be employed is molded in fast, it is rarely, if ever, perfectly straight and parallel with the face of the cushion, and that most materials adapted to be molded in will be either destroyed or impaired by the heat to which the rubber has to be subjected in the mold to effect the vulcanization; and, second, that when a core is used to form a hole for the subsequent insertion of the wire or cord to be used, it is impossible to mold the hole in exactly true and straight, and difficult, and sometimes impossible, to set and hold the core in a right line, or to withdraw it from the cushion. These difficulties have rendered it necessary, in practice, to either mold in a cord or strip, which, from its size and character, was not efficient as an auxiliary to the cushion, or which had its efficiency destroyed in the vulcanizing, or to use a core which was either too large to make a hole of the proper size, or, if smaller, had to be cut out, thus forming a slit from the hole outward, through either the face or top surface of the cushion.

By my invention I propose to overcome all these difficulties, and afford a means by which, with perfect facility, rubber vulcanized cushions can be manufactured with a hole or holes molded in, or "cored out," as near the face and top as may be desired, of as small diameter as may be needed, and perfectly true and parallel with the face or edge of the rubber body; and to these ends and objects my invention consists in a mold or apparatus, composed of the properly-shaped parts, as usual, in which the rubber mass is shaped and held during the process of vulcanization, and a wire or other core which, when properly placed in the green mass, is strained up and held under tension, by any suitable device or means for that purpose, whereby I am enabled to insure perfect accuracy in the hole to be formed, and a perfect parallelism between it and the face of the cushion, and can thus mold cushions with very small holes.

To enable those skilled in the art to make and use my invention, I will proceed to more fully describe it referring by letters to the accompanying drawings, in which—

Figure 2:
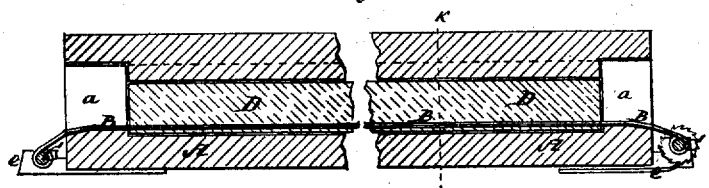
Figure 3:
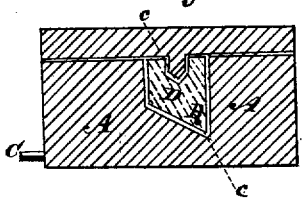

Figure 1 is a plan or top view of my improved apparatus or vulcanizing-mold. Fig. 2 is a longitudinal section at the line *e e*, Fig. 3; and Fig. 3 is a vertical cross-section at the line *k k* of Fig. 2.

A represents a mold or flask, of the proper form and size, made in two parts, as usual, and formed with slots at *a a*, to accommodate a wire core, B, which, after having been inserted in the rubber to be molded, is secured at its ends to windlass shafts or spindles C. These shafts or spindles are properly secured in suitable lugs or projecting ears *e* on the flask A, and may be made or provided with suitable ratchet-wheels and pawls for holding them, and with a square end to receive a key or wrench for turning them, in such a manner that they may be turned, in one direction, to wind up and draw taut the wire or cord core B. In the use of my improved apparatus the wire or other flexible core B is first properly inserted in the rubber body D while the material is in a green or soft condition; the rubber and core are then placed in the flask, the protruding ends of the wire or other core B being secured to the shafts C, and the core strained up or drawn taut, and the mold being closed in the usual way, the whole is placed in the vulcanizing-chamber, and subjected to the usual process. Upon extraction of the cushion from the mold, and the withdrawal of the core, the cushion D will be perfectly molded and vulcanized, as usual, and will have formed in it a perfectly true and smooth hole, perfectly parallel with the straight face or edge of the cushion. The hole will be of a diameter corresponding to that of the core employed, and will be located at such distances from the upper and face sides of the cushion as the core B may have been adjusted to.

In the practical application or working of my invention, I have found it a good plan to take a piece of sheet rubber and envelop with it the core; then place the core and rubber envelope on the face of the mass of soft material, and put the whole into the mold, to shape and vulcanize. In this manner I have found it easy to effect the withdrawal of the core, and that the edge or face of the cushion and the hole will be always perfectly parallel and true.

It will be understood that, in carrying out my invention, other means than those shown may be employed for holding or straining up the wire core B, and that said core may be made of any size and material desirable, and may be so located as to produce the cushion with a hole located farther from or nearer to the face of the cushion; the gist of my invention resting in the idea of forming the requisite hole by the use of a core strained up or held taut, to induce to trueness and a parallelism between the hole and the perfectly-straight edge of the molded block of rubber; and it will be understood that if it be desired to make a cushion with a series of small wires or re-enforcing springs, the holes for any number of such wire or other springs or cords can be made by duplicating the core B any number of times, and placing the additional cores where desired in the mold, and holding them under tension, as described.

Having fully described my invention, so that one skilled in the art can understand and practice it, what I claim as new, and desire to secure by Letters Patent, is—

In combination with the mold, a core firmly held under tension or in a strained condition, substantially as and for the purpose described.

In testimony whereof I have hereunto set my hand and seal this 16th day of October, 1873.

MATHEW DELANEY. [L. S.]

In presence of—
J. N. McINTIRE,
JACOB FELBEL.